Patented July 30, 1929.

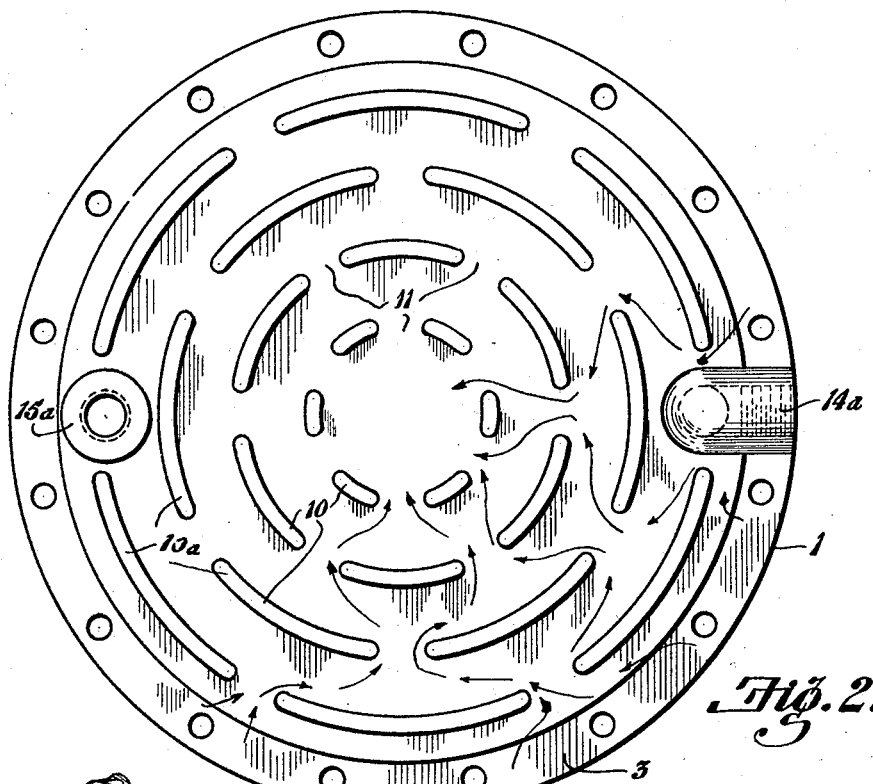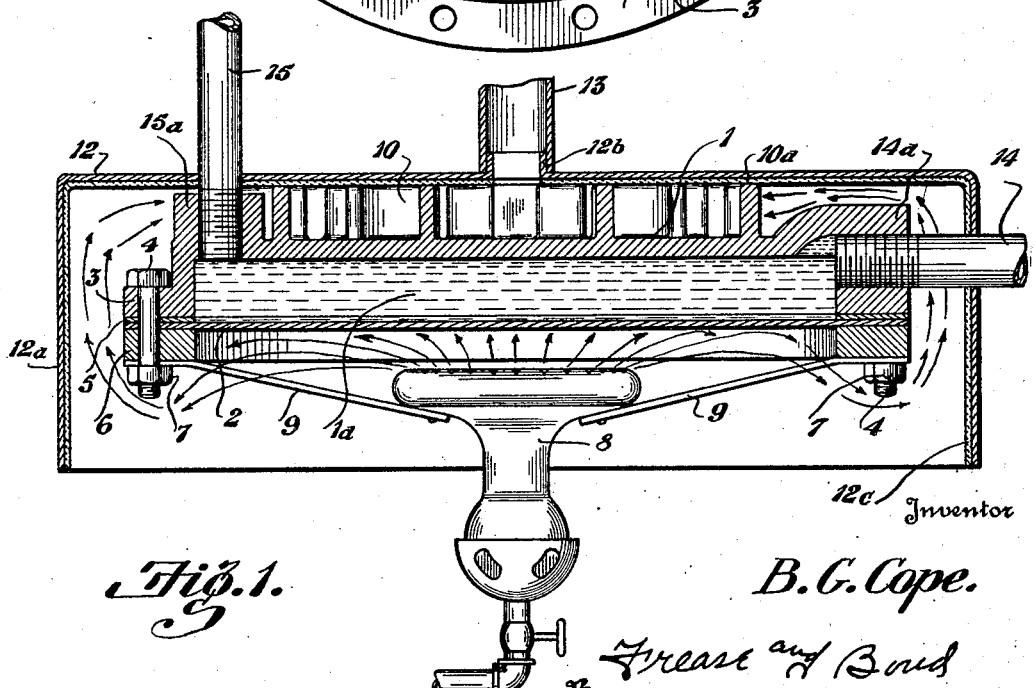

1,722,661

UNITED STATES PATENT OFFICE.

BURTON G. COPE, OF ORRVILLE, OHIO.

WATER HEATER.

Application filed September 4, 1924. Serial No. 735,812.

The invention relates to water heaters having thin metal heating plates; and the object of the improvement is to provide a heater having a removable thin metal heating plate and fin means for collecting the heat in the properly directed flue gases, ordinarily wasted.

The invention is illustrated in the accompanying drawings forming part hereof, in which—

Figure 1 is a vertical cross-section of the heater; and

Fig. 2, a top plan view of the heater fin plate.

Similar numerals refer to similar parts throughout the drawings.

The heater includes the fin plate 1 and removable thin heating plate 2, the fin plate having the shouldered flange 3 for connection to the heating plate by bolts 4, a gasket 5 being located between the plates, and a ring 6 being located between the heating plate and the nuts 7 which co-operate with bolts 4 to fasten the parts together, thus forming the water heating chamber 1$^a$.

A gas burner 8 is suspended beneath the heating plate as by the brackets 9 fastened to the burner and to the heater.

The fin plate is provided with a plurality of preferably concentric fins 10 having staggered notches 11. The cover 12, having the depending peripheral flange 12$^a$ depending below the burner 8 and connected to the central chimney 13 as by cylindric neck 12$^b$, seats upon the coplanar tops 10$^a$ of the fins 10, and thus provides a tortuous path about the fins for the combustion gases of the flames from the burner 8 after directly heating the thin plate 2, said path being indicated on the drawing by means of arrows.

A lining 12$^c$ of insulating material is preferably located upon the walls of the hood or cover 12 to minimize the radiation of heat from said cover.

Water is fed into the heating chamber 1$^a$ through the inlet pipe 14 threaded to neck 14$^a$ of fin plate 1, and discharges from the heating chamber through outlet pipe 15 threaded to neck 15$^a$ of the fin plate.

The water thus fed through the heating chamber receives heat through the thin plate 2 directly from the flame of the burner 8, and receives more heat ordinarily wasted through the fins 10 of the plate 1 from the flame combustion gases directed as above described. Thus the heater of the present invention permits a more efficient utilization of the available heat than has heretofore been possible.

The provision of a readily removable thin heating plate 2 fastened to the fin plate by means of the bolts 4 and nuts 7 cooperating with ring 6 and gasket 5, renders it very convenient to replace a heating plate which has been burnt through by the continuous action of the flame over a long period.

From the above it will be obvious that a simple heater is provided which will not only rapidly heat water by passing the gases of combustion entirely around the heater and retarding the passage of said gases in order that the maximum heat may be derived from them; but the heater may be easily and readily cleaned of lime deposit which rapidly collects where hard water is used. It is only necessary to remove the bolts 4 in order that the ring 6 and thin plate 2 may be removed, giving access to the interior of the heater and to the inlet and outlet pipes, all of which may be easily cleaned of lime deposit.

I claim:

A water heater including an upper fin plate and a lower relatively thin heating plate joined to each other and forming an internal water heating chamber having a water inlet and a water outlet, and a burner, the heating plate being in the path of the burner flame, and the fin plate having external fins in the path of the flame combustion gases, there being a cover contacting with the edges of the fins and having a depending peripheral flange surrounding the fin plate and a central outlet for directing the gases about the fins.

In testimony that I claim the above, I have hereunto subscribed my name.

BURTON G. COPE.